US011471957B2

(12) United States Patent
Merson

(10) Patent No.: US 11,471,957 B2
(45) Date of Patent: Oct. 18, 2022

(54) METHOD AND APPARATUSES RELATED TO HOLE CUTTING

(71) Applicant: SANDVIK INTELLECTUAL PROPERTY AB, Sandviken (SE)

(72) Inventor: Eleanor Merson, Huddersfield (GB)

(73) Assignee: Sandvik Intellectual Property AB, Sandviken (SE)

(*) Notice: Subject to any disclaimer, the term of this patent is extended or adjusted under 35 U.S.C. 154(b) by 672 days.

(21) Appl. No.: 16/305,545

(22) PCT Filed: May 30, 2017

(86) PCT No.: PCT/EP2017/062946
§ 371 (c)(1),
(2) Date: Nov. 29, 2018

(87) PCT Pub. No.: WO2017/207517
PCT Pub. Date: Dec. 7, 2017

(65) Prior Publication Data
US 2021/0220927 A1  Jul. 22, 2021

(30) Foreign Application Priority Data

Jun. 2, 2016  (EP) ..................................... 16172552

(51) Int. Cl.
*B23B 49/02* (2006.01)
*B23B 51/00* (2006.01)
*B23D 77/06* (2006.01)
*B23B 35/00* (2006.01)

(52) U.S. Cl.
CPC .............. *B23B 49/02* (2013.01); *B23B 51/00* (2013.01); *B23D 77/06* (2013.01); *B23B 35/00* (2013.01); *B23B 2226/275* (2013.01)

(58) Field of Classification Search
CPC ... B23B 49/02; B23B 51/00; B23B 2226/275; B23D 77/00; B23D 77/06; Y10T 408/26
See application file for complete search history.

(56) References Cited

U.S. PATENT DOCUMENTS

| | | | | |
|---|---|---|---|---|
| 2,424,709 A | * | 7/1947 | Riggs | B26F 1/3846 82/48 |
| 4,008,631 A | * | 2/1977 | Hahn | B23B 3/161 82/1.11 |
| 4,131,385 A | * | 12/1978 | Narang | B23B 49/023 408/115 B |
| 4,229,640 A | * | 10/1980 | Castellani Longo | B23K 26/0823 219/121.6 |
| 4,300,417 A | * | 11/1981 | Teunissen | B23P 25/003 451/53 |

(Continued)

FOREIGN PATENT DOCUMENTS

DE  3629553 A1  3/1988
GB  1387577 A1  3/1975
(Continued)

*Primary Examiner* — Eric A. Gates
(74) *Attorney, Agent, or Firm* — Corinne R. Gorski

(57) ABSTRACT

A method for hole cutting in a workpiece made of CFRP with a cutting tool including at least one cutting edge is provided. Further, a hole cutting assisting apparatus and an apparatus for hole cutting includes a cutting tool, a drive for rotating the cutting tool, and a heating element configured for heating at least a portion of the cutting edge of the cutting tool.

14 Claims, 3 Drawing Sheets

(56) References Cited

U.S. PATENT DOCUMENTS

| | | | | |
|---|---|---|---|---|
| 4,555,204 A | * | 11/1985 | Cassidenti | B23B 51/00 407/119 |
| 4,733,049 A | * | 3/1988 | Lemelson | B23B 49/001 219/121.65 |
| 5,328,761 A | * | 7/1994 | Omori | C23C 16/02 428/336 |
| 5,701,578 A | * | 12/1997 | Liu | B22F 3/24 428/565 |
| 6,146,476 A | * | 11/2000 | Boyer | B23B 51/00 148/525 |
| 7,665,935 B1 | | 2/2010 | Garrick et al. | |
| 7,780,432 B2 | * | 8/2010 | De Traglia Amancio Filho | B29C 65/64 425/517 |
| 7,955,459 B2 | * | 6/2011 | Chen | B29C 65/645 156/73.5 |
| 8,882,410 B2 | * | 11/2014 | Owens | B29C 35/02 408/1 R |
| 2007/0086867 A1 | | 4/2007 | Kesterson et al. | |
| 2012/0269591 A1 | * | 10/2012 | Shimada | B23B 51/02 408/1 R |

FOREIGN PATENT DOCUMENTS

| | | | |
|---|---|---|---|
| JP | 03208534 A | * | 9/1991 |
| WO | 87/04092 A1 | | 7/1987 |
| WO | 2007017681 A2 | | 2/2007 |

\* cited by examiner

METHOD AND APPARATUSES RELATED TO HOLE CUTTING

RELATED APPLICATION DATA

This application is a § 371 National Stage Application of PCT International Application No. PCT/EP2017/062946 filed May 30, 2017 claiming priority to EP 16172552.8 filed Jun. 2, 2016.

TECHNICAL FIELD

The present invention relates to a method for hole cutting in a workpiece comprising CFRP. The present invention further relates to a hole cutting assisting apparatus for guiding a rotating cutting tool. The present invention also relates to an apparatus for hole cutting in a workpiece comprising CFRP.

BACKGROUND

When machining workpieces, it has long been common practice to cool the relevant cutting tool in order to prolong tool life. However, more recently machining methods have been developed where heat is applied to a workpiece in order to achieve certain advantages during machining.

U.S. Pat. No. 8,053,705 discloses a laser assisted machining process and machine utilizing multiple distributed laser units that are strategically distributed around the workpiece being machined to simultaneously heat the workpiece, creating a desired temperature distribution for laser assisted machining. Sequential incremental heating from different directions and positions are used, resulting in longer tool life and shorter machining time.

SUMMARY

It is an object of the present invention to provide a method for hole cutting in a workpiece comprising Carbon Fibre Reinforced Plastic, CFRP, which prolongs tool life and/or ensures consistent workpiece quality adjacent to a cut hole.

According to an aspect of the invention, the object is achieved by a method for hole cutting in a workpiece comprising CFRP with a cutting tool comprising at least one cutting edge, the method comprising steps of:
heating at least one portion of the cutting edge,
rotating a cutting tool comprising a cutting edge, and thereafter
feeding the cutting tool into the workpiece for cutting material from the workpiece whereby a hole is formed in the workpiece.

Since at least a portion of the cutting edge is heated prior to the cutting tool being fed into the workpiece, a glass temperature of the CFRP is reached in the workpiece earlier than if the cutting edge is not heated prior to being fed into the workpiece. Namely, it has been realised by the inventor that the carbon fibres of the CFRP are cut in bundles once the glass temperature has been reached or exceeded thus, reducing the abrasive wear caused by the carbon fibres compared to when the glass temperature has not been reached and the carbon fibres are cut individually. As a result, the above mentioned object is achieved. Moreover, reaching the glass temperature reduces delamination in the CFRP thus, ensuring consistent high workpiece quality adjacent to the hole having been cut.

The term "hole cutting" encompasses, but is not limited to, drilling, reaming, boring, tapping (thread cutting), counter boring and countersinking. Drilling entails forming a hole in a solid workpiece. The hole may be a through hole or a blind hole. Reaming, boring, counter boring and countersinking are various operations for enlarging a hole, either the entire hole or only a portion of the hole. The hole may have a cross section that has a circular, an oval or irregular shape, for example.

Heating of the at least one portion of the cutting edge may be performed in various different ways, such as e.g. by induction, with a laser, by blowing heated gas over the cutting tool, by leading a heated fluid through the cutting tool, and/or by feeding the cutting tool through a piece of sacrificial material.

Accordingly, the at least one portion of the cutting edge may be heated by direct application of heat and/or heating energy directly to the cutting edge, or indirectly by application of heat and/or heating energy to the cutting tool in a region different than the cutting edge.

Carbon Fibre Reinforced Plastic, CFRP, has a glass temperature, which also may be referred to as a glass-transition temperature. At the glass-transition temperature a glass-liquid transition takes place, which is a reversible transition from a hard and relatively brittle "glassy" state of the CFRP into a rubbery state. CFRP is commonly used e.g. in the aerospace industry, and more recently in the automobile industry, and in the energy/power generation industry. Cutting CFRP may cause problems due to the CFRP being prone to delamination. Also cutting tool wear is a problem when cutting CFRP. In particular, these problems have manifested themselves during hole cutting in CFRP.

It has been realised by the inventor that the long duration of the cutting tool engaging with a workpiece during turning and/or milling operations may affect the cutting of CFRP in a positive manner. Investigation has revealed that the long durations of engagement between cutting tool and a CFRP workpiece cause stable temperature conditions above the glass temperature of the relevant CFRP in the cutting edge of the cutting tool. The inventor found that the glass temperature of the CFRP had a much bigger than expected impact on cutting tool life. Thus, the inventor realised that when cutting CFRP cutting tool wear is reduced, if the cutting tool edge has a temperature at or above the glass temperature of the relevant CFRP. This realisation has been utilised in the present invention related to hole cutting, according to which heating at least one portion of the cutting edge is performed.

It has been realised by the inventor that in prior art hole cutting operations, in particular in thin CFRP workpieces or when cutting shallow holes, the cutting tool does not reach the glass temperature and/or cools down to a temperature below the glass temperature between each hole cutting operation. Further it has been realised by the inventor that heating the CFRP workpiece prior to hole cutting may be difficult to achieve to a sufficient depth in the workpiece. Thus, according to the present invention at least one portion of the cutting edge is heated. Surprisingly, it has been found that a heated cutting edge achieves a sufficient heating of the workpiece just at the cutting zone. Thus, it has proven to be enough for the workpiece to have a temperature above the glass transition in a very limited area at the cutting edge for achieving reduce wear of the cutting edge.

It is a further object of the present invention to provide a hole cutting assisting apparatus for assisting hole cutting in a workpiece comprising CFRP, which prolongs tool life and/or ensures workpiece quality adjacent to a cut hole.

According to an aspect of the invention, the object is achieved by a hole cutting assisting apparatus for guiding a rotating cutting tool comprising at least one cutting edge into a workpiece comprising CFRP, wherein the hole cutting assisting apparatus comprises:

a heating element configured for heating at least a portion of the cutting edge of the cutting tool, and a bushing for guiding the cutting tool into the workpiece.

Since the hole cutting assisting apparatus comprises the heating element configured for heating at least a portion of the cutting edge of the cutting tool, a glass temperature of the CFRP is reached early during cutting a hole in the workpiece. Accordingly, the above mentioned object is achieved.

It is a further object of the present invention to provide an apparatus for hole cutting in a workpiece comprising CFRP which prolongs tool life and/or ensures workpiece quality adjacent to a cut hole.

According to an aspect of the invention, the object is achieved by an apparatus for hole cutting in a workpiece comprising CFRP, wherein the apparatus for hole cutting comprises:

a cutting tool comprising at least one cutting edge, and a drive for rotating the cutting tool, and a heating element configured for heating at least a portion of the cutting edge of the cutting tool, and wherein the apparatus is configured for performing a method according to any one aspect and/or embodiment disclosed herein.

Since the apparatus for hole cutting comprises the heating element configured for heating at least a portion of the cutting edge of the cutting tool, a glass temperature of the CFRP is reached early during cutting a hole in the workpiece. Accordingly, the above mentioned object is achieved.

Further features of, and advantages with, the present invention will become apparent when studying the appended claims and the following detailed description.

BRIEF DESCRIPTION OF THE DRAWINGS

Various aspects of the invention, including its particular features and advantages, will be readily understood from the example embodiments discussed in the following detailed description and the accompanying drawings, in which.

DETAILED DESCRIPTION

Aspects of the present invention will now be described more fully. Like numbers refer to like elements throughout. Well-known functions or constructions will not necessarily be described in detail for brevity and/or clarity.

The present invention involves the application of controlled and localised heat to a cutting tool and/or a cutting edge of the cutting tool to raise the temperature prior to cutting to a point such that the glass transition temperature of a relevant CFRP is exceeded in a following hole cutting process. By applying this technology, the tool life of cutting tools in a variety of CFRP materials may be e.g. approximately tripled. Hole quality also may be improved, particularly with respect to reduction and/or elimination of delamination in the CFRP material.

Figure 1:
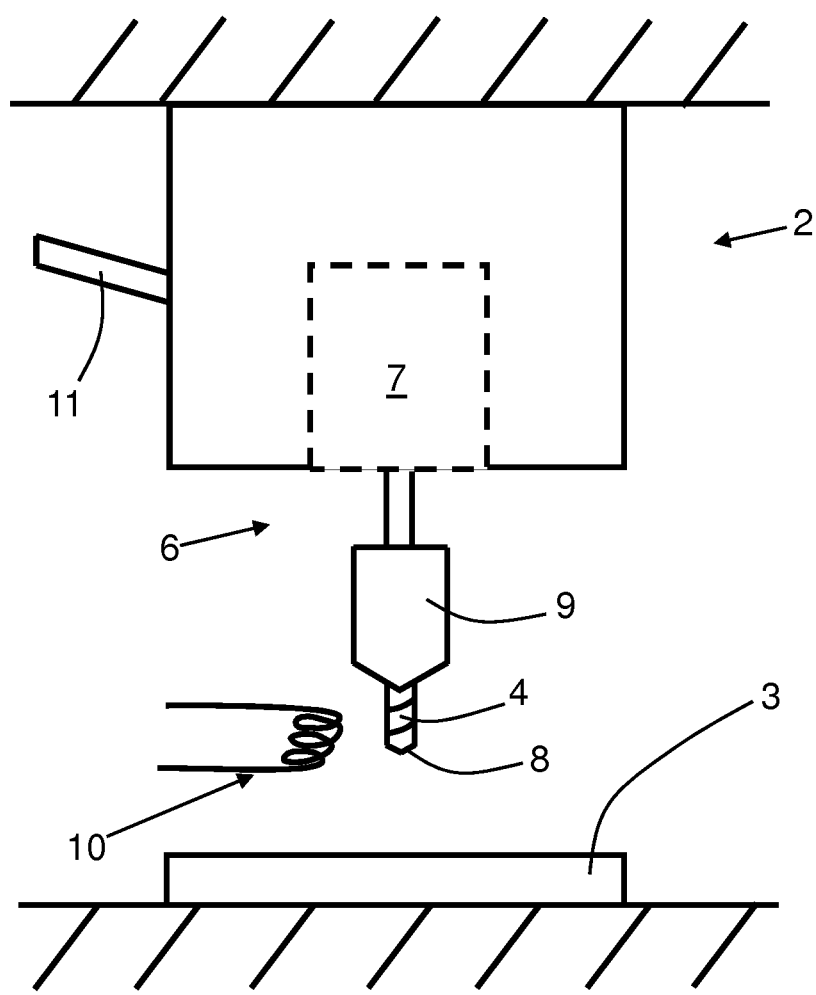
FIG. 1 schematically illustrates embodiments of an apparatus for hole cutting in a workpiece comprising CFRP.

FIG. 1 schematically illustrates embodiments of an apparatus 2 for hole cutting in a workpiece 3 comprising CFRP. The apparatus 2 for hole cutting comprises a cutting tool 4 and a drive 6 for rotating the cutting tool 4. The drive 6 may comprise e.g. an electric, hydraulic, or pneumatic motor 7, and a chuck 9 or similar device for connecting the cutting tool 4 to the motor 7. The cutting tool 4 comprises at least one cutting edge 8. The cutting edge 8 is devised for axial and/or radial hole cutting, i.e. the cutting edge 8 may cut in an axial direction of a hole being cut or of an existing hole, and/or in a radial direction of an existing hole.

The apparatus 2 comprises a heating element 10 configured for heating at least a portion of the cutting edge 8 of the cutting tool 4. The apparatus 2 is configured for performing a method according to any aspect and/or embodiment discussed herein. Suitably, the portion of the cutting edge 8 being heated by the heating element 10 comprises a radially outer portion of the cutting edge 8, such as e.g. a radially outer corner portion of the cutting edge 8. If the cutting tool 4 comprises more than one cutting edge 8, some or all of the cutting edges may be heated by the heating element 10.

The heating element 10 may apply heat or heating energy to the cutting edge 8 from one side of the cutting tool 4, as illustrated in FIG. 1. Alternatively, the heating element 10 may extend radially around at least part of the cutting tool 4, or the heating element 10 may be arranged at least partially inside the cutting tool 4. One option may be to include at least part of the heating element 10 in a clamping mechanism, used for securely holding the workpiece during the hole cutting operation.

One or more indications may be provided to an operator of the apparatus 2 concerning a heating status of the cutting edge 8, e.g. by means of light signals provided by one or more LED:s (not shown). Thus, it may be ensured that the cutting edge 8 is heated to a desired temperature.

The apparatus 2 may be a manually operated drill press, as illustrated, comprising a lever 11 for manually feeding the cutting tool 4 into the workpiece 3. According to alternative embodiments, the apparatus 2 may be a manually operated hand-held tool. According to further embodiments, the apparatus 2 may be a fully automated machine, e.g. computer controlled machine, such as a CNC machine. The apparatus 2 according to the present invention is not limited to these example apparatuses, but encompasses any apparatus comprising the features defined in the appended claims. In automated machines, proper heating of the cutting edge 8 prior to the cutting tool 4 engaging with the workpiece 3, may be ensured by setting a time period during which the heating element 10 applies heat to at least a portion of the cutting edge 8.

Figures 2A, 2B:
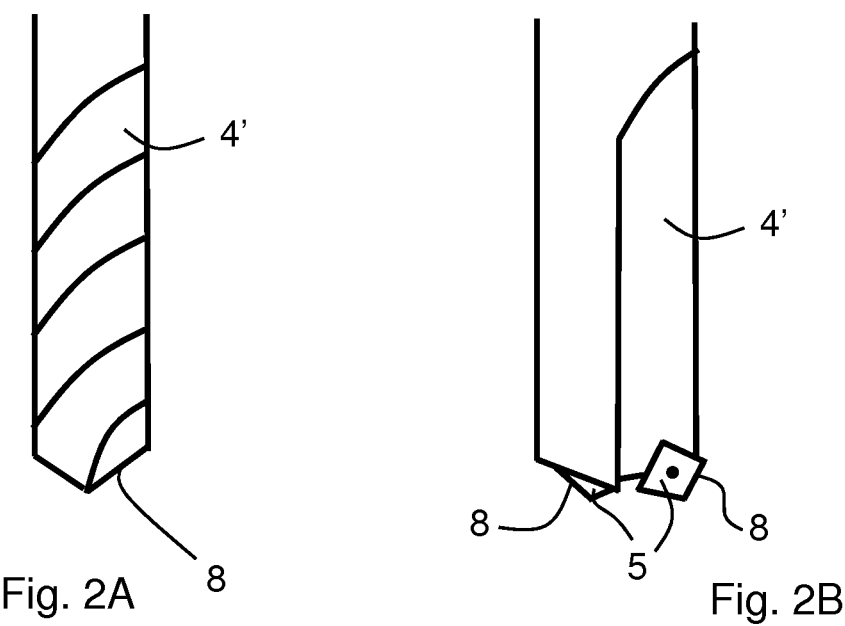
FIGS. 2A-2B illustrate embodiments of drilling tools.

According to embodiments, the cutting tool may be a drilling tool 4'. FIGS. 2A and 2B illustrate embodiments of drilling tools 4', each drilling tool 4' comprising at least one cutting edge 8. The drilling tool 4' may be a solid drill bit, the at least one cutting edge forming an integrated part of the drilling tool 4', as illustrated in FIG. 2A. The drilling tool 4' may be a drill comprising at least one exchangeable cutting insert 5, the at least one exchangeable cutting insert 5 comprising the at least one cutting edge 8, as illustrated in FIG. 2B. Irrespective of the type of drilling tool 4', the heating element 10 of the apparatus 2 is configure to heat the at least one cutting edge 8 of the drilling tool 4'.

Figure 3:
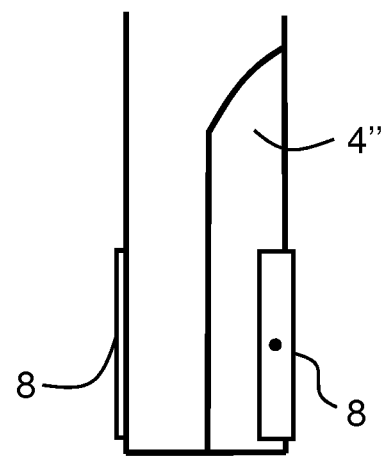
FIG. 3 illustrates embodiments of a reamer, FIG. 4 schematically illustrates embodiments of hole cutting assisting apparatuses for guiding a rotating cutting tool.

According to embodiments, the cutting tool may be a reamer 4". FIG. 3 Illustrates embodiments of a reamer 4". The reamer 4" comprises at least one cutting edge 8. The heating element 10 of the apparatus 2 is configure to heat the at least one cutting edge 8 of the reamer 4'.

Mentioned purely as an example, the heating element 10 may comprise an inductive coil configured for producing an oscillating magnetic field, and/or a laser, and/or a heating member for heating gas and a fan for directing the heated gas onto the cutting edge and/or the cutting tool, and/or a member for heating fluid which is conducted through channels in the cutting tool.

According to embodiments, the apparatus 2 for hole cutting may comprise a hole cutting assisting apparatus 12 according to aspects and/or embodiments discussed herein.

Figure 4:
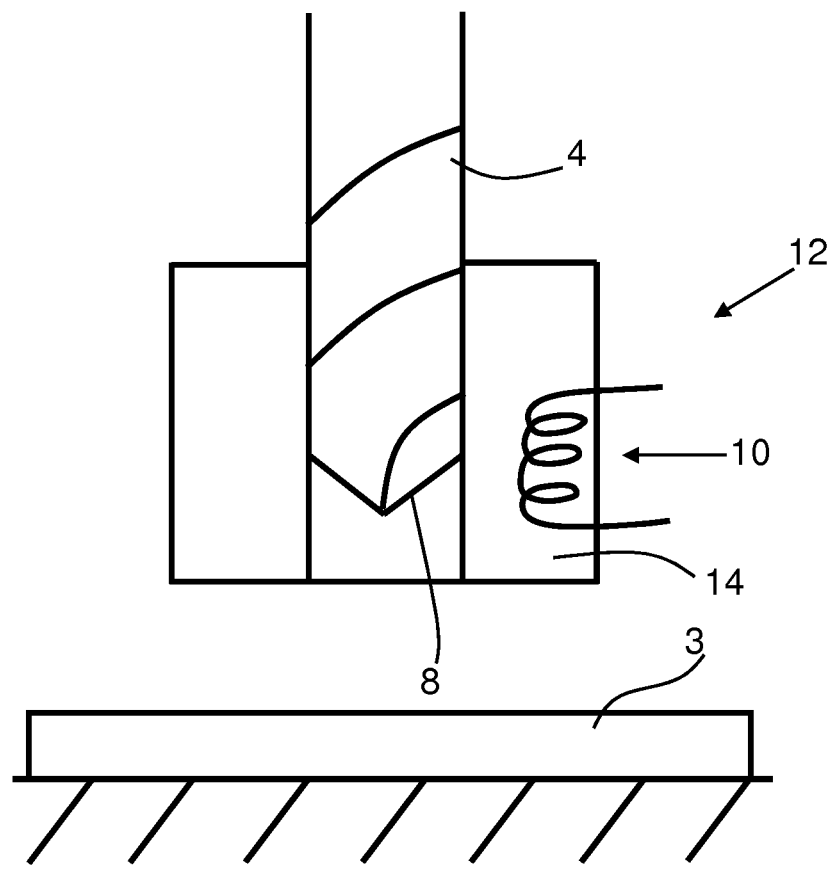

FIG. 4 schematically illustrates embodiments of hole cutting assisting apparatus 12 for guiding a rotating cutting tool 4 comprising at least one cutting edge 8 into a workpiece 3 comprising CFRP. FIG. 4 illustrates a partial cross section through the whole cutting assisting apparatus 12. The hole cutting assisting apparatus 12 comprises:

- a heating element 10 configured for heating at least a portion of the cutting edge 8 of the cutting tool 4, and
- a bushing 14 for guiding the cutting tool 4 into the workpiece 3.

According to embodiments, the heating element 10 may be at least partially arranged in the bushing 14.

The bushing 14 may be hand-held by an operator. In such case the bushing 14 may be placed against the workpiece 3 for guiding the cutting tool 4 precisely positioned into the workpiece 3. Prior to engaging with the workpiece 3, at least a portion of the cutting edge 8 of the cutting tool 4 is heated by the heating element 10. Again, one or more indications may be provided to the operator of the apparatus 2 concerning a heating status of the cutting edge 8.

Mentioned purely as an example, again the heating element 10 may comprise an inductive coil configured for producing an oscillating magnetic field, and/or a laser, and/or a heating member for heating gas and a fan for directing the heated gas onto the cutting edge and/or the cutting tool.

Figure 5:
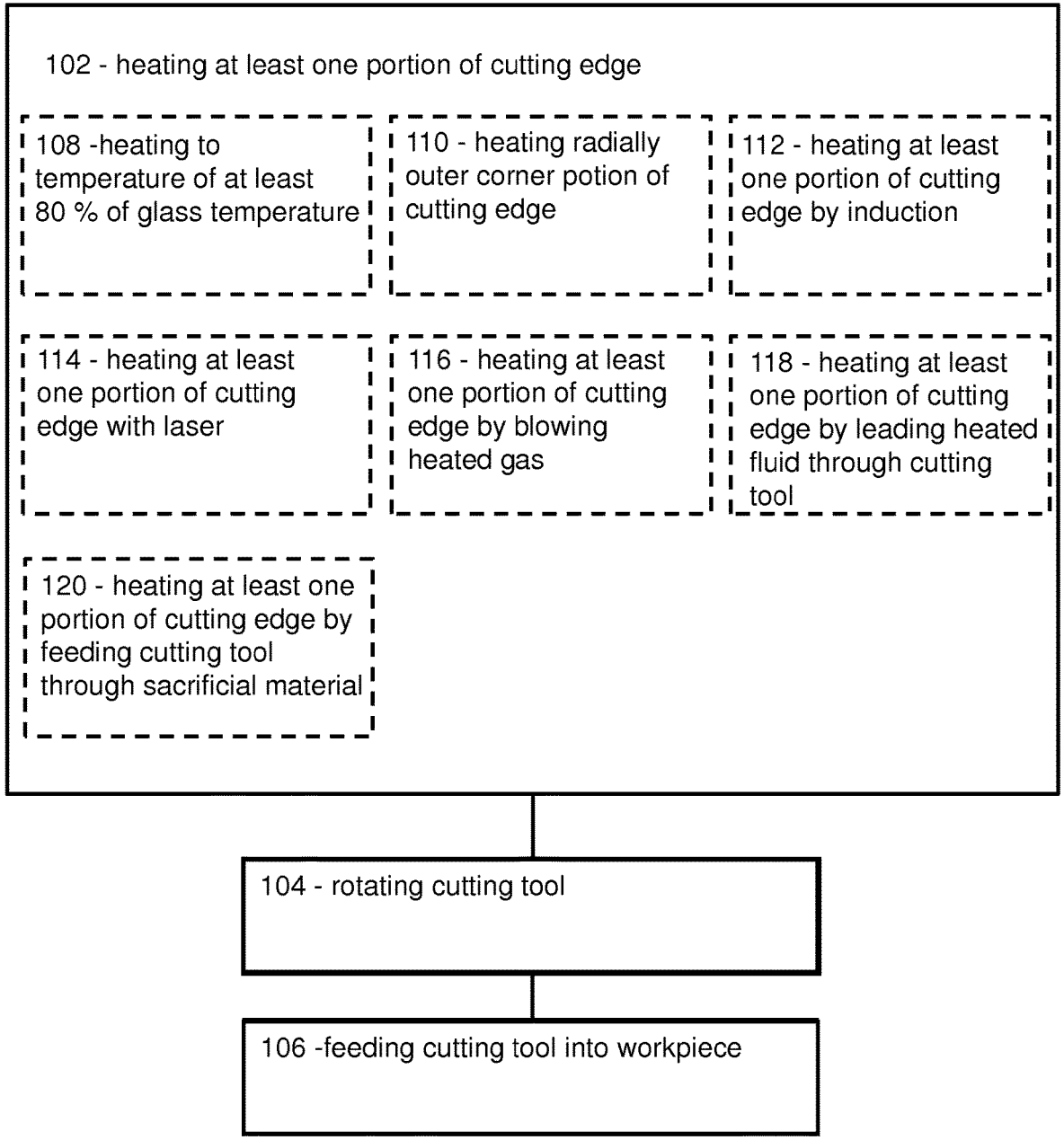
FIG. 5 illustrates a method for hole cutting in a workpiece comprising CFRP.

FIG. 5 illustrates a method 100 for hole cutting in a workpiece comprising CFRP with a cutting tool comprising at least one cutting edge. The method comprises steps of:

- heating 102 at least one portion of the cutting edge,
- rotating 104 a cutting tool comprising a cutting edge, and thereafter
- feeding 106 the cutting tool into the workpiece for cutting material from the workpiece whereby a hole is formed in the workpiece.

The step of heating 102 at least one portion of the cutting edge may be performed prior to the step of rotating 104 the cutting tool. Alternatively, the step of heating 102 at least one portion of the cutting edge may be performed simultaneously with the step of rotating 104 the cutting tool. Only once the step of heating 102 at least one portion of the cutting edge has been performed the step of feeding 106 the cutting tool into the workpiece is performed.

According to embodiments, the step of heating 102 at least one portion of the cutting edge may comprise:

- heating 108 to a temperature of at least 80% of a glass temperature of the CFRP. In this manner the at least one portion of the cutting edge will reach the glass temperature at the latest shortly after the cutting tool engaging with the workpiece. Thus, the structure of the CFRP is maintained in an area of the hole being cut, while also the wear on the cutting tool is reduced compared to if the at least one portion of the cutting tool were not heated prior to engaging with the workpiece. Accordingly, the step of heating 108 to a temperature of at least 80% of a glass temperature of the CFRP may be performed before the cutting edge engages with the workpiece.

Naturally, the step of heating 102 may comprise heating the at least one portion of the cutting edge to the glass temperature or to a temperature above the glass temperature. The glass temperature varies between different kinds of CFRP. Mentioned purely as an example, for some CFRP:s the glass temperature may be within a range of 180°-210° C.

According to embodiments, the step of heating 108 to a temperature of at least 80% of a glass temperature of the CFRP may comprise heating the CFRP to a temperature of approximately 90% of the glass temperature of the CFRP.

According to some embodiments, the step of heating 102 at least one portion of the cutting edge may comprise heating the at least one portion of the cutting edge to a temperature within a range of 150-170° C. This may be a temperature which may be adequate for various kinds of CFRP since it is within a suitable range of the glass temperatures of various kinds of CFRP having a glass temperature within a range of 190-210° C.

One way of ensuring that a correct temperature in the cutting edge is achieved during the step of heating 102 at least one portion of the cutting edge, may be calibration hole cutting in samples of the relevant CFRP workpiece. That is, the duration of heat application and/or heating effect/energy is to be established by cutting a number of test holes. Below the glass temperature of the CFRP cutting forces are higher than above the glass temperature of the CFRP. Calibration hole cutting comprises heating the at least one portion of the cutting edge under various conditions, performing test hole cutting, and comparison of cutting forces. Thus, heating conditions for the cutting edge and the cutting tool may be selected from the tests providing low cutting forces. Alternative ways of ensuring that a correct temperature in the cutting edge is achieved during the step of heating 102 at least one portion of the cutting edge, may be by monitoring workpiece quality in holes being cut, either manually or automatically with picture analysis equipment. A further possibility may be to measure cutting edge temperature using e.g. an IR camera or thermocouples.

The step of heating 102 at least one portion of the cutting edge may comprise one or more of:

- heating an entire front end of the relevant cutting tool, the front end comprising the cutting edge,
- heating the entire cutting edge,
- heating only a portion of the cutting edge.

Moreover, the step of heating 102 at least one portion of the cutting edge may comprise indirect heating of the portion of the cutting edge by heating a portion of the cutting tool not comprising the cutting edge, and rely on the heat being conducted to the cutting edge via the cutting tool. Thus, the at least one portion of the cutting edge may be heated in cutting tools where the cutting edge is difficult to access for direct heat application.

According to embodiments, the step of heating 102 at least one portion of the cutting edge may comprise:

- heating 110 a radially outer corner portion of the cutting edge. In this manner already such heating may increase cutting tool life since the radially outer corner portion of the cutting edge is subjected to most wear during cutting.

The step of heating 102 of the at least one portion of the cutting edge may be performed in various different ways.

According to embodiments, the step of heating 102 at least one portion of the cutting edge may comprise:

- heating 112 the at least one portion of the cutting edge by induction. In embodiments where the cutting tool comprises conductive material, inductive heating may be an efficient and convenient way of heating the at least one portion of the cutting edge.

Heating by induction utilises electromagnetic induction. Heat is generated in the cutting edge and/or cutting tool by eddy currents. An induction heater comprises an electromagnet, and an electronic oscillator that passes a high-frequency alternating current through the electromagnet thus generating eddy currents in the cutting edge and/or cutting tool. The heat is generated inside the cutting edge and/or cutting tool itself. The term "heating energy" used herein may relate to a thus created oscillating magnetic field causing electromagnetic induction. Accordingly, the term heating element used herein encompasses also an induction heater, e.g. comprising an inductive coil.

According to embodiments, the step of heating 102 at least one portion of the cutting edge may comprise:

heating 114 the at least one portion of the cutting edge with a laser. A laser may be directed towards a precise area of the cutting tool for heating that particular area, i.e. in this case the laser is directed towards the at least one portion of the cutting edge. The cutting tool may be non-rotating during the step of heating 114 the at least one portion of the cutting edge with a laser in order to be able to focus the laser on the cutting edge, or at least one portion of the cutting edge such as e.g. a radially outer corner portion of the cutting edge.

According to embodiments, the step of heating 102 at least one portion of the cutting edge may comprise:

heating 116 the at least one portion of the cutting edge by blowing heated gas over the at least one portion of the cutting edge. Warm gas for heating the cutting tool may be easily produced e.g. heated air may be provided by an electric heating element and a fan.

According to embodiments, the step of heating 102 at least one portion of the cutting edge may comprise:

heating 118 the at least one portion of the cutting edge by leading a heated fluid through the cutting tool.

In such embodiments, the cutting tool may be provided with internal channels, through which the heated fluid is conducted in order to heat the at least one portion of the cutting edge.

According to embodiments, the step of heating 102 at least one portion of the cutting edge may comprise:

heating 120 the at least one portion of the cutting edge by feeding the cutting tool through a piece of sacrificial material. Utilising a sacrificial material may be a convenient way of heating the cutting tool prior to the cutting tool entering the workpiece. For instance, a piece of CFRP of similar kind as the workpiece may be used as a sacrificial material thus, ensuring that a temperature of the cutting edge in a region within the glass temperature of the relevant CFRP is achieved.

It is to be understood that the foregoing is illustrative of various example embodiments and that the invention is defined only by the appended claims. A person skilled in the art will realize that the example embodiments may be modified, and that different features of the example embodiments may be combined to create embodiments other than those described herein, without departing from the scope of the present invention, as defined by the appended claims.

The invention claimed is:

1. An apparatus for hole cutting in a workpiece of CFRP, wherein the apparatus for hole cutting comprises: a cutting tool including at least one cutting edge; a drive arranged to rotate the cutting tool; and a heating element configured for heating at least a portion of the cutting edge of the cutting tool, wherein the at least one portion of the cutting edge is heated to a temperature of at least 80% of a glass temperature of the CFRP and wherein the at least one portion of the cutting edge is heated prior to the cutting tool being fed into the workpiece, such that a glass temperature of the CFRP is reached in the workpiece earlier than if the cutting edge would not have been heated prior to being fed into the workpiece.

2. The apparatus for hole cutting according to claim 1, wherein the cutting tool is a drilling tool.

3. The apparatus for hole cutting according to claim 1, wherein the cutting tool is a reamer.

4. The apparatus for hole cutting according to claim 1, further comprising a hole cutting assisting apparatus including the heating element and a bushing for guiding the cutting tool into the workpiece.

5. The apparatus for hole cutting according to claim 1, wherein the at least one portion of the cutting edge is heated to a temperature of at least 150° C.

6. A method for hole cutting in a workpiece of CFRP with an apparatus for hole cutting according to claim 1, the method comprising steps of: heating at least one portion of the at least one cutting edge of the cutting tool; rotating the cutting tool; and thereafter feeding the cutting tool into the workpiece for cutting material from the workpiece whereby a hole is formed in the workpiece.

7. The method according to claim 6, wherein the step of heating the at least one portion of the cutting edge includes heating to a temperature of at least 80% of a glass temperature of the CFRP.

8. The method according to claim 7, wherein the step of heating to a temperature of at least 80% of a glass temperature of the CFRP is performed before the cutting edge engages with the workpiece.

9. The method according to claim 6, wherein the step of heating the at least one portion of the cutting edge includes heating the at least one portion of the cutting edge by induction.

10. The method according to claim 6, wherein the step of heating the at least one portion of the cutting edge includes heating the at least one portion of the cutting edge with a laser.

11. The method according to claim 6, wherein the step of heating the at least one portion of the cutting edge includes heating the at least one portion of the cutting edge by blowing heated gas over the at least one portion of the cutting edge.

12. The method according to claim 6, wherein the step of heating the at least one portion of the cutting edge includes heating the at least one portion of the cutting edge by leading a heated fluid through the cutting tool.

13. The method according to claim 6, wherein the step of heating at least one portion of the cutting edge includes heating the at least one portion of the cutting edge by feeding the cutting tool through a piece of sacrificial material.

14. The method according to claim 6, wherein the step of heating the at least one portion of the cutting edge includes heating a radially outer corner portion of the cutting edge.

* * * * *